(12) United States Patent
Hebling et al.

(10) Patent No.: US 9,128,349 B2
(45) Date of Patent: Sep. 8, 2015

(54) PULSE EXCITED THZ WAVEGUIDE SOURCE BASED ON OPTICAL RECTIFICATION

(75) Inventors: János Hebling, Pécs (HU); Gábor Almási, Kozármisleny (HU); László Pálfalvi, Pécs (HU); József Fülöp, Pécs (HU)

(73) Assignee: PECSI TODOMANYEGYETEM, Pecs (HU)

( * ) Notice: Subject to any disclaimer, the term of this patent is extended or adjusted under 35 U.S.C. 154(b) by 3 days.

(21) Appl. No.: 13/825,534

(22) PCT Filed: Aug. 5, 2011

(86) PCT No.: PCT/HU2011/000081
§ 371 (c)(1),
(2), (4) Date: Jun. 14, 2013

(87) PCT Pub. No.: WO2012/038768
PCT Pub. Date: Mar. 29, 2012

(65) Prior Publication Data
US 2013/0259437 A1    Oct. 3, 2013

(30) Foreign Application Priority Data
Sep. 22, 2010 (HU) .................................. 1000514

(51) Int. Cl.
*G02F 1/35* (2006.01)
*G02F 1/365* (2006.01)

(52) U.S. Cl.
CPC .............. *G02F 1/365* (2013.01); *G02F 1/3534* (2013.01); *G02F 2203/13* (2013.01)

(58) Field of Classification Search
CPC .... G02F 2203/13; G02F 1/365; G02F 1/3534
See application file for complete search history.

(56) References Cited

U.S. PATENT DOCUMENTS 7,421,171 B2 * 9/2008 Ibanescu et al. ............... 385/122
8,050,531 B2 * 11/2011 Rahman et al. ............... 385/142
(Continued)

OTHER PUBLICATIONS

Suizu, K. et al., "Extremely frequency-widened terahertz wave generation using Cherenkov-type radiation," Optics Express, OSA (Optical Society of America), Washington DC, US, Apr. 7, 2009, vol. 17, No. 8, pp. 6676-6681.
(Continued)

*Primary Examiner* — Rhonda Peace
(74) *Attorney, Agent, or Firm* — Birch, Stewart, Kolasch & Birch, LLP

(57) ABSTRACT

The invention is a THz waveguide source (3) having a core (9) of great nonlinear coefficient and of a great absorption. The source (3) is adapted to behave as a waveguide in pumping and also in THz range. The THz waveguide source (3) has a cladding of smaller absorption coefficient in the THz range than that of the core. The solution according to the invention diminishes the influence of absorption, while enhances efficiency of generating THz radiation. The waveguide structure and the tilted pulse front excitation together results a greater interaction length and thus a greater THz generating efficiency. According to the solution of the invention highly efficient compact THz waveguide sources can be realized.

4 Claims, 2 Drawing Sheets

(56) References Cited

U.S. PATENT DOCUMENTS

| | | | |
|---|---|---|---|
| 8,305,679 B2* | 11/2012 | Kondo et al. | 359/326 |
| 8,384,989 B2* | 2/2013 | Kondo et al. | 359/330 |
| 8,481,945 B2* | 7/2013 | Koyama et al. | 250/341.1 |
| 2002/0024718 A1* | 2/2002 | Kawase et al. | 359/330 |
| 2005/0242287 A1* | 11/2005 | Hakimi | 250/363.09 |
| 2007/0297734 A1* | 12/2007 | Ibanescu et al. | 385/125 |
| 2008/0099698 A1* | 5/2008 | Rahman et al. | 250/493.1 |
| 2008/0159342 A1 | 7/2008 | McCaughan et al. | |
| 2010/0054296 A1* | 3/2010 | Ohtake et al. | 372/80 |
| 2011/0032601 A1* | 2/2011 | Kondo et al. | 359/330 |
| 2013/0259437 A1* | 10/2013 | Hebling et al. | 385/122 |

OTHER PUBLICATIONS

Bodrov, S. B. et al., "Highly efficient optical-to-terahertz conversion in a sandwich structure with LiNbO3 core," Optics Express, Sep. 29, 2009, vol. 17, No. 3, pp. 1871-1879.

Hebling, J. et al., "Velocity matching by pulse front tilting for large-area THz-pulse generation," Optics Express, Oct. 21, 2002, vol. 10, No. 21, pp. 1161.

Hebling, J. et al., "Generation of high-power terahertz pulses by tilted-pulse-front excitation and their application possibilities," Journal of the Optial Society of America, Washington, US, Jul. 1, 2008, vol. 25, No. 7, pp. B6-B19.

\* cited by examiner

PULSE EXCITED THZ WAVEGUIDE SOURCE BASED ON OPTICAL RECTIFICATION

The invention relates to a waveguide structured terahertz (THz) radiation source having a waveguide core of great non-linear optical coefficient and of great absorption. THz radiation is generated through optical rectification of ultrashort light pulses in the visible or near infrared range. The radiation source is adapted to behave as a waveguide in pumping and also in THz range. The THz waveguide source has a cladding of orders of magnitude smaller absorption coefficient in the THz range than that of the core. Due to this the influence of absorption is diminished while the efficiency of generating THz radiation is enhanced.

In recent years application of THz radiation sources in the field of medical diagnostics and various security techniques (e.g. passenger check at airports, drug analysis) has developed dynamically.

Generation of THz frequency with non-linear optical techniques is a known and effective method. In the known solutions in order to achieve good efficiency it is a requirement for the non-linear optical material to have great non-linear coefficient and small absorption coefficient. To ensure velocity matching between pumping and the generated signal is also a requirement.

A scheme for generating THz radiation based on optical rectification is described in the publication titled "Velocity matching by pulse front tilting for large area THz-pulse generation" by J. Hebling, G. Almási, I. Z. Kozma and J. Kuhl (Opt Expr. 10, 1161 2002). Here $LiNbO_3$ (hereinafter LN) crystal is used as non-linear optical medium because of its outstanding great non-linear optical coefficient. In case of optical rectification matching the group velocity of the pump pulse and the phase velocity of the generated THz radiation is required, that is the condition of velocity matching must be fulfilled. Velocity matching in case of LN is a big problem since the group velocity of pumping is greater than the phase velocity of the THz radiation. To overcome this problem the above document proposes the tilted pulse front excitation scheme. However, the above mentioned publication does not take measures to eliminate the effect of the significant absorption in the LN on the <10 THz frequency range (see "Temperature dependence of the absorption and refraction of Mg-doped congruent and stoichiometric $LiNbO_3$ in the THz range" by L. Pálfalvi, J. Hebling, J. Kuhl, Á. Péter and K. Polgár (J. Appl. Phys. 97, 123505, 2005)).

Radiation sources are known which in order to fulfil the condition of velocity matching use a waveguide structure which behaves as waveguide for pumping as well as for the THz signal. These are described in the following publications: "Design of terahertz waveguides for efficient parametric terahertz generation by W. Shi, Y. Ding (Appl. Phys. Lett 82, 4435 2003) and U.S. Pat. No. 7,272,158 B1 titled "Highly efficient waveguide pulsed THz electromagnetic radiation source and group-matched waveguide THz electromagnetic radiation source" by R. R. Hayes, S. Ionov, I. V. Ionova. This solution ensures that the field strength of the THz components generated in different points are added up in the same phase which is an important factor for increased efficiency of radiation generation. However, the waveguide structure by itself does not solve the problem caused by the significant absorption of LN in the THz range.

In other solutions in order to eliminate the deteriorative effect of absorption the thin LN layer (having a thickness in the range of micrometers) is sandwiched between a material having an absorption coefficient essentially smaller than that of the LN (see the documents titled: "Highly efficient optical-to-terahertz conversion in a sandwich structure with $LiNbO_3$ core" by S. B. Bodrov, A. N. Stepanov, M. I. Bakunov, B. V. Shishkin, I. E. Ilyakov, R. A. Akhmedzhanov, Opt. Expr. 17, 1871 2009 and "Extremely frequency-widened terahertz wave generation using Cherenkov-type radiation" by K. Suizu, K. Koketsu, T. Shibuya, T. Tsutsui, T. Akiba, K. Kawase, Opt. Expr. 17, 6676 2009). The parameters of the material and geometry are selected so that the structure does not behave as a waveguide in the THz range—as it is shown in the first Figures of the above mentioned publications—since the THz radiation at the point of radiation leaves LN in a slanting direction when entering the neighbouring medium. In this manner the length of propagation in LN is significantly decreased thereby the loss in absorption is minimized. However, in case of this type of excitation—since the interaction length is significantly smaller—the efficiency of THz generation is lower than in the case of velocity matched waveguide. In addition, in this case the intensity of the THz components generated at individual points is summed up instead of the same phase field strengths as it is the case with velocity matched waveguide.

In patent application US 20080159342 A1 a complicated dual waveguide structure is used for minimizing the absorption of an optic material with great non-linearity. The solution described in US 20080159342 A1 is complicated and has several functional disadvantages.

In patent application US 20080159342 A1 the dual waveguide structure channel (the range where the effective THz excitation takes place) is narrowed down to a cross-section of 90 nm×9 μm. An object of the present invention is to avoid this geometric limitation of the waveguide structure in order to increase the THz energy. Another object is to ensure the variability of the angle of tilt for the pulse front enabling tuning of the radiation source.

In patent application US 20080159342 A1 the difference frequency generated by about 1500 nm wavelength pump beams provides a continuous or quasi continuous THz radiation, whereas in the solution according to the present invention wideband, high energy terahertz pulses are generated through optical rectification by using a single pump beam thus providing a simpler means for pumping.

In patent application US 20080159342 the thickness of the waveguide cladding is limited. A further object of the present invention is to eliminate this disadvantage by enabling the use of a waveguide cladding of optional thickness which makes technical implementation simpler.

In patent application US 20080159342 the upper limit for the index of refraction of the material of the waveguide cladding is 2.5. A further object of the present invention is to eliminate this unfavourable restriction. It has been realized that in case of tilted pulse front excitation there is no such limit.

According to the foregoing the object of the present invention is to provide a THz radiation source with enhanced efficiency and a high structural uniformity. This object is realized by using a great-nonlinear optical coefficient material the THz absorption coefficient of which does not need particular restrictions since its unfavourable effect is diminished significantly. According to the present invention the absorption coefficient of the used material may be one order of magnitude greater as compared to known implementations. This results a greater interaction length and thus a greater THz radiation generating efficiency.

In the following a detailed description of the invention will be given with reference to the accompanying drawings in which.

Figure 3:
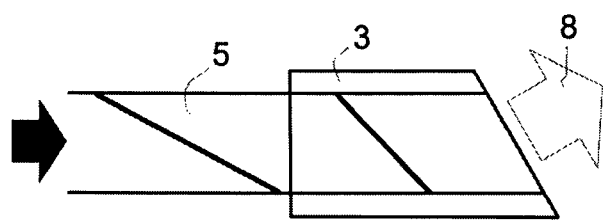
Figure 4:
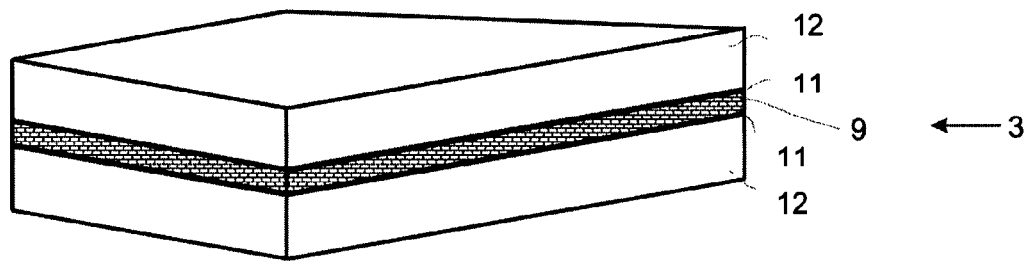

FIG. 3 schematically shows the tilted pulse front excitation of THz radiation in THz waveguide source;

FIG. 4 is a three-dimensional schematic drawing of an embodiment of the THz waveguide source including a film.

An embodiment and operation of the radiation source according to the invention is described with reference to FIGS. 1, 2 and 3.

Figure 1:
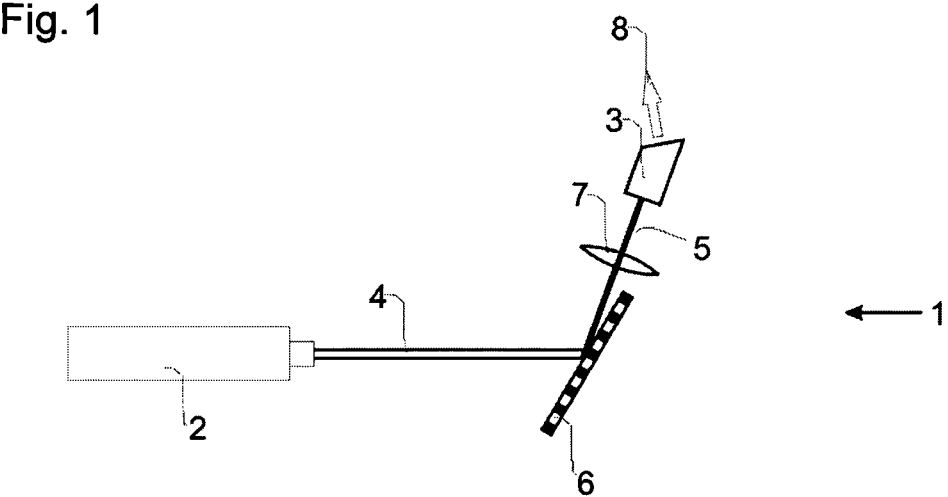
FIG. 1 shows the apparatus for generating THz radiation schematically.
Figure 2:
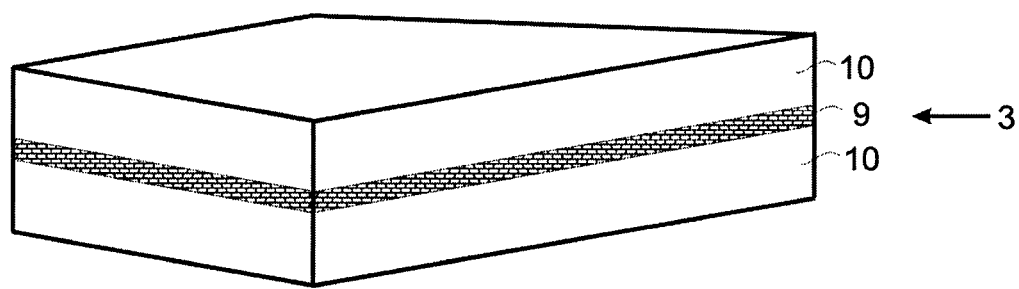
FIG. 2 is a three-dimensional schematic drawing of the THz waveguide source.

FIG. 1 schematically shows the arrangement of the apparatus for generating THz radiation. The radiation source comprises the following functional components:

Optical grating 6 serving for tilting the intensity front of the laser beam 4 generated by pump laser 2. The pulse front tilt of laser beam 5 is caused by diffraction on the optical grating 6 and passing through imaging lens 7. Than the laser beam 5 with tilted intensity front reaches (enters) THz waveguide source 3. At the output of THz waveguide source 3 THz radiation 8 emerges. Functional arrangement of the essential components of the invention is also shown in FIG. 1. THz waveguide source is shown in FIG. 2 where the THz waveguide source 3 includes a waveguide core 9 sandwiched in cladding 10.

In the following the operation of the THz waveguide source is described with reference to the Figures. The energy source for THz generation is ensured by pump laser 2 typically operating in the visible or near infrared range producing pulses typically with a femtosecond—picosecond pulse duration for departing laser beam 4. Departing laser beam 4 diffracted by optical grating 6 becomes pulse front tilted which means that the intensity front gets tilted relative to the wave front, as it is described in details in publication titled "Tunable THz pulse generation by optical rectification of ultrashort laser pulses with tilted pulse front" (J. Hebling, A. G. Stepanov, G. Almási, B. Bartal, J. Kuhl Appl. Phys. B 78 593 2004). By means of imaging lens 7 tilted pulse front laser beam 5 is directed to the input of waveguide core 9. By properly selecting the grating constant and the geometric arrangement of optical grating 6 it can be attained that the intensity front of the tilted pulse front laser beam be inclined in core 9 to such an extent that velocity matching between pump pulses and the generated THz radiation may be realized. In FIG. 3 excitation of tilted pulse front THz radiation in THz waveguide source 3 is shown schematically. Slanted lines in the Figure show the tilt of the pulse front before the waveguide and in the waveguide (see "Tunable THz pulse generation by optical rectification of ultrashort laser pulses with tilted pulse front" by J. Hebling, A. G. Stepanov, G. Almási, B. Bartal, J. Kuhl (Appl. Phys. B 78 593 2004)). Owing to the waveguide based operation—in case of optimal geometry and typical pumping—pulse front tilt of lesser degree is needed than in a crystal (see publication titled "Velocity matching by pulse front tilting for large area THz-pulse generation" by J. Hebling, G. Almási, I. Z. Kozma and J. Kuhl (Opt. Expr. 10, 1161 2002)). By this means the effective interaction length of the pump pulse is increased four times greater thus resulting a greater THz generation efficiency.

There are materials (e.g. LN) which have extremely large non-linear optical coefficient. For this reason they could be promising for generating THz radiation, however, significant absorption (typically 10-100 $cm^{-1}$) in <10 THz frequency range is rather disadvantageous.

The essence of the invention is to use efficiently—as THz radiation source—a material having great non-linearity and high absorption.

To minimize the absorption losses according to the invention the following measures are taken. On the one hand the material of the cladding 10 is selected so that the absorption coefficient of the cladding 10 is smaller than that of the waveguide core 9. On the other hand the thickness of the waveguide core 9 and cladding 10 is determined so that high percentage (80-90%) of the energy of the generated THz radiation propagates in cladding 10 (B. E. A. Saleh, M. C. Teich: "Fundamentals of Photonics, $2^{nd}$ edition (2007) ISBN-10: 0-471-35832-0). In addition it is required for THz waveguide source 3 to behave as a waveguide in THz frequency range and also in the frequency range of pumping. To this the index of refraction of the material of cladding 10 must be smaller in the frequency range of pumping and also in the THz frequency range than that of the waveguide core 9.

Owing to the mechanism of generating THz radiation the advantage of the solution of the present invention as opposed to the solutions described in the publications mentioned earlier ("Highly efficient optical-to-terahertz conversion in a sandwich structure with $LiNbO_3$ core" by S. B. Bodrov, A. N. Stepanov, M. I. Bakunov, B. V. Shishkin, I. E. Ilyakov, R. A. Akhmedzhanov, Opt. Expr. 17, 1871 2009 and "Extremely frequency-widened terahertz wave generation using Cherenkov-type radiation" by K. Suizu, K. Koketsu, T. Shibuya, T. Tsutsui, T. Akiba, K. Kawase, Opt. Expr. 17, 6676 2009) is that the field strengths of the THz components generated at different points are added together instead of their intensity thus enhancing the efficiency of THz radiation generation since the intensity is proportional to the square of the field strength.

A further embodiment of the invention is described with reference to FIG. 4. It is noted that for the sake of clearness the schematic drawings in FIG. 4 and FIG. 2 are not scaled. In FIG. 4 the cladding consists of two parts, a film 11 and an outer cladding 12.

A suitable cladding material 10, 12 to use with waveguide core 9 formed from LN (or other material with similar parameters) can be silicon (Si) since over THz range its absorption coefficient is two orders of magnitude smaller than that of the LN. In addition its index of refraction is also smaller in this range. However, the problem is that over the typical frequency range of pumping the index of refraction of Si forming cladding 10 is greater than the index of refraction of the LN forming waveguide core 9.

To solve this problem a thin film having an index of refraction smaller over the frequency range of pumping than that of the waveguide core 9 is positioned in the vicinity of the core. The thickness of the film is nearly one order of magnitude greater than the pump wavelength and nearly one order of magnitude smaller than the THz wavelength. For example in an LN-Si composite THz waveguide source 3 polyethylene can be used as suitable material for film 11. In this embodiment cladding 10 is provided with outer cladding 12 preferably made of silicon.

Through the described embodiments of the invention it can be seen that materials with great non-linear coefficient may be used for highly efficient THz generation even if they have a great absorption coefficient. With the solution of the invention it becomes possible to make the cladding from materials having greater index of refraction over the frequency range of pumping than that of the core by applying a film with a small index of refraction between the core and the cladding.

The embodiments of the invention may be realized in compact form offering a wide range of practical application. The materials used in the exemplary embodiments of the invention are not limited to LN, Si and polyethylene, other materials of similar nature may also be used.

The invention claimed is:

1. A pulse excited THz waveguide source (3) based on optical rectification having a waveguide core (9) formed from a nonlinear optical material wherein
   said waveguide core (9) has an absorption coefficient greater than 10 cm$^{-1}$ over the THz range,
   said waveguide core (9) is adapted to behave as a waveguide for pumping and also for transmission over the THz range,
   said waveguide source (3) is provided with a cladding (10) having an absorption coefficient smaller over the THz range than that of said waveguide core (9),
   said waveguide source (3) is excited by tilted pulse front excitation, and
   a thickness of the waveguide core (9) and the cladding (10) is determined so that 80-90% of the energy of the generated THz radiation propagates in cladding (10).

2. The THz waveguide source (3) according to claim 1, wherein a film (11) forming a part of said THz waveguide source (3) and having an index of refraction smaller in the pump wavelength than that of the waveguide core (9) is positioned between said waveguide core (9) and said cladding (10).

3. The THz waveguide source (3) according to claim 1, wherein the material of said waveguide core (9) is $LiNbO_3$.

4. The THz waveguide source (3) according to claim 1, wherein said waveguide core (9) is provided with a waveguide cladding (10) made of silicon.

* * * * *